Feb. 12, 1946.  D. R. PIATT ET AL  2,394,634
TORQUE MEASURING TOOL
Filed Dec. 27, 1944  2 Sheets-Sheet 1

INVENTORS
D. R. PIATT
R. UNTERSCHUTZ
BY
ATTORNEY

Feb. 12, 1946. D. R. PIATT ET AL 2,394,634
TORQUE MEASURING TOOL
Filed Dec. 27, 1944 2 Sheets-Sheet 2
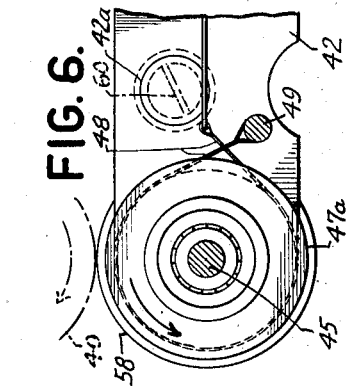
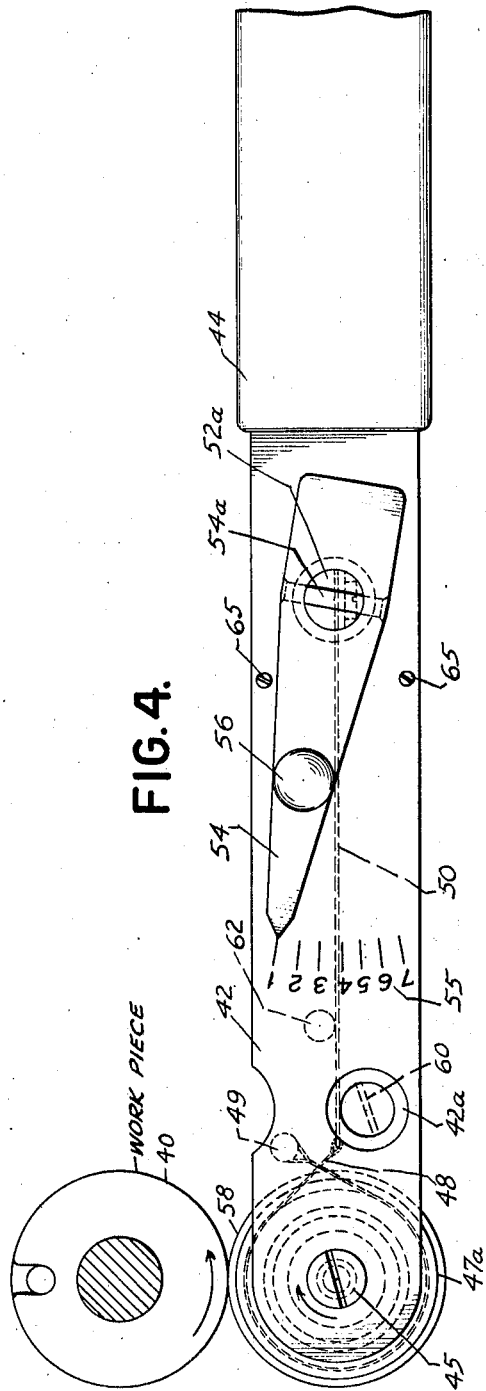
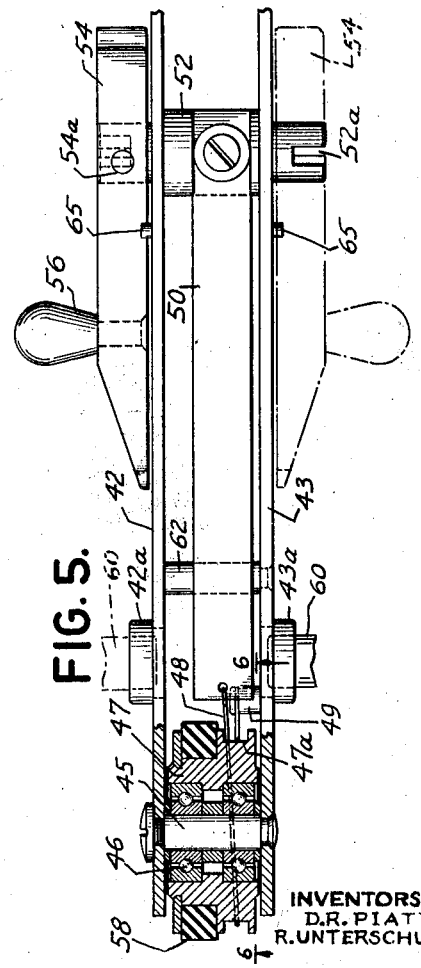
INVENTORS
D.R. PIATT
R. UNTERSCHUTZ
BY
ATTORNEY Patented Feb. 12, 1946

2,394,634

UNITED STATES PATENT OFFICE 2,394,634

TORQUE MEASURING TOOL

Donald R. Piatt and Roman Unterschutz, Endicott, N. Y., assignors to International Business Machines Corporation, New York, N. Y., a corporation of New York Application December 27, 1944, Serial No. 569,983

8 Claims. (Cl. 73—134)

This invention relates to torque measuring devices.

The general object of the invention is to provide a hand tool of novel construction to be applied to a work piece to determine its torque.

An object of the invention is, more specifically, to provide a hand tool, which includes torque counterbalancing means of the automatically variably resistant type, such as a spring counterbalance, to be operated by hand conjointly with torque indicating means.

An object of the invention is, further, to provide a torque tester including counterbalancing and indicating means capable of finding the drive torque of a rotating work piece when it is rotating in either clockwise or counterclockwise direction.

An object of the invention is, further, to provide a torque tester with simplified means for braking the movement of a work piece and indicating its torque.

An object of the invention is, further, to provide a torque tester constructed and used as a hand tool and with novel means for transmitting the rotation of a work piece to braking and indicating means in the hand tool.

Other objects of the invention will be pointed out in the following description and claims and illustrated in the accompanying drawings which disclose, by way of examples, the principle of the invention and the best mode, which has been contemplated, of applying that principle.

In the drawings:

Fig. 4 is an outside view of a modification of the torque testing tool constructed according to the invention, showing its application to a work piece when rotating in a clockwise direction.

Fig. 5 is a partially sectional bottom view of the torque testing tool shown in Fig. 4.

Fig. 6 is a section along lines 6—6 of Fig. 5.

Figure 1:
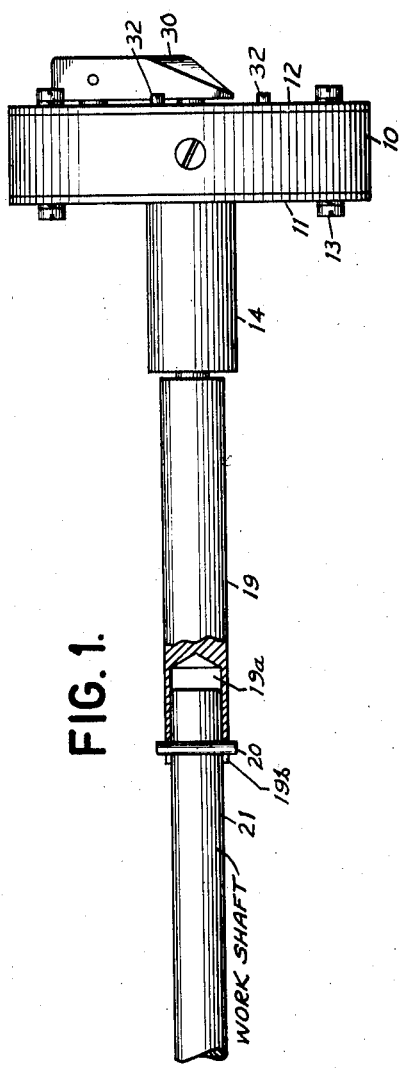
Fig. 1 is an outside view of one form of the torque testing tool constructed according to the invention, showing the manner of application of the tool to a work shaft. A small fragment of the tool is shown in section.
Figure 3:
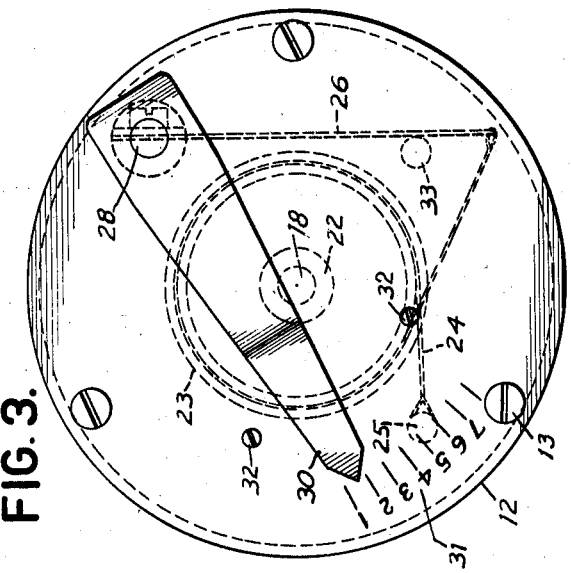
Fig. 3 is a rear view of this torque testing tool, showing its indicating side.
Figure 2:
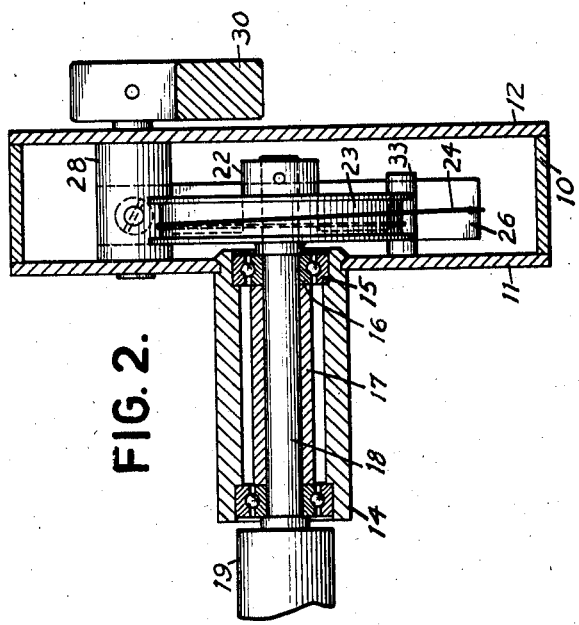
Fig. 2 is a sectional view through the torque testing tool illustrated in Fig. 1.

Referring to Figs. 1 to 3, the first form of a torque tester constructed according to my invention is shown. The torque tester comprises a drum casing consisting of a cylindrical shell 10 and front and rear plates 11 and 12 held together rigidly by three bolts 13. Secured to and extending forwardly of the front plate is a ball bearing assembly including outer shell 14, ball cages 15 and 16, and spacer 17. The shaft 18 of an adapter or coupler 19 passes through the spacer 17 and its rear end has pinned to it the hub 22 of a brake drum 23. The coupler 19 and drum are suitably held in rigid relation to the inner ball cages 16 so as to rotate therewith. It will be seen that the drum 23 is housed within the drum casing 10—11—12. The drum is made of steel or its equivalent and the drum periphery is highly polished.

The adapter 19 has a bore 19a in its front end to fit over an end of a work shaft 21, thereby to centralize the torque tester with the axis of the work shaft. Notches 19b are provided in the front end of the adapter to receive the projecting ends of a pin 20 secured to the shaft 21 and thereby to couple the adapter and the attached drum to the shaft for common rotation.

Wrapped around drum 23 is a wire 24 of phosphor bronze or its equivalent. One end of wire 24 is anchored to a stud 25 extending inwardly from front plate 11. The other end of wire 24 is attached to the free end of a leaf spring 26 which is to serve as a variably resistant torque counterbalance. Spring 26 is fixed to the flat portion of a pivot member 28 so as to be flexed by turning of the pivot member. The pivot member 28 has reduced round ends journaled in the plates 11 and 12. Pinned to the reduced end of the pivot member 28 and extending outside of the plate 12 is an index member or pointer 30. The pointed end of the member 30 is adapted to scan a graduated scale 31 inscribed on the outside face of plate 12. The index member 30 may be rocked between two limit stops 32 extending from rear plate 12.

In the unoperated positions of the parts, spring 26 abuts a fixed stud 33 projecting inwardly from front plate 11. It is assumed that the torque to be measured will exceed 1½ oz. inches. Hence, the spring 26 normally is at such flexure as to counterbalance a torque of about 1½ oz. inches, as indicated by the position of the index member 30 shown in Fig. 3. It will be noted that the drum casing encloses the drum 23, leaf spring 26, and all the other parts except the index member, ball bearing assembly, and adapter. This torque testing and measuring tool is adapted to determine the torque of a work piece rotating in a direction such that when the adapter 19 is coupled thereto, the work piece will rotate the adapter and drum 23 in counterclockwise direction (as viewed in Fig. 3). It is understood that shaft 21 is rotated by a suitable releasable drive (not shown).

To find the drive torque of shaft 21, the adapter 19 is placed in coupling connection with the shaft as shown in Fig. 1. With the operator holding the casing 10—11—12 stationary in one hand and the index member 30 in its normal position, shaft 21 will rotate adapter 19 and drum 23 freely. While holding the casing stationary in one hand, the operator moves the index member 30 counterclockwise with the other hand. Pivot member 28 turns with the index member and increases the flexure of leaf spring 26, thereby increasing the spring tension applied to wire 24. The wire tightens around drum 23 and when sufficient spring tension has been applied thereto, the wire is so tight on the drum as to brake it to a stop. Consequently, adapter 19 and work shaft 21 are stalled. The point of the indicating scale 31 at which the index member is positioned at the time the shaft 21 is stalled measures the driving torque of the shaft.

Figs. 4 to 6 show a modification of the torque tester. This tester is capable of finding the drive torque of a work piece while rotating in either clockwise or counterclockwise direction. As an illustration, the work member is a disk 40 rotatable by a suitable releasable drive (not shown) in either clockwise or counterclockwise direction. The torque tester comprises a pair of spaced apart and parallel side plates 42 and 43 rigidly secured to a handle 44. A pin 45 is fixed between the plates 42 and 43 at their forward ends. Journaled on the pin 45, through ball bearings 46, is a member 47 made of steel. One portion of member 47 is formed as a brake drum 47a equivalent to drum 23 of the torque tester shown in Figs. 1 to 3 and described before. Wrapped around the highly polished drum surface is a wire 48 of phosphor bronze material or the equivalent. One end of the wire 48 is anchored to a stud 49 projecting inwardly from side plate 43. The other end of the wire 48 is secured to the free end of a leaf spring 5. At its opposite end, spring 50 is attached to the flat, central portion of a pivot member 52 which has reduced ends journaled in the side plates 42 and 43. These reduced ends extend outside the side plates and are formed with slots 52a adapted to receive a pin 54 a secured to an index member 54 and crossing an opening in the index member. The opening in the index member is of a size to fit over either projecting end of the pivot member 52. When the index member 54 is thus placed on an end of the pivot member 52, the pin 54a enters the slot 52a in the end of the pivot member. The index member may thus be removably, interchangeably coupled to either end of the pivot member in such manner that upon rocking of the index member it will rock the pivot member. The index member 54 is held to either reduced end of the pivot member 52 by friction and by the pressure of the operator's hand on knob 56 during the application of the tool to the work. Each of the side plates 42 and 43 is inscribed on its outer face with a similar scale 55 of ounce-inch torque graduations and numbers. Thus, when the index member is attached to the end of the pivot member projecting past the plate 42, the index member will coact with the scale on the face of side plate 42, as shown in Fig. 4. When the index member is attached to the end of the pivot member projecting past the side plate 43, as indicated by dot and dash lines in Fig. 5, the index member will coact with the scale inscribed on the face of plate 43. Stops 65 provided on each side plate limit the swing of the index member.

Fixedly mounted on the member 47 is a friction ring 58 made of rubber or a suitable equivalent. Side plates 42 and 43 are provided with similar, cupped buttons 42a and 43a, respectively. Each of these buttons is adapted to fit over a fixed element 60 which is not part of the torque tester but is mounted, in a manner not shown, in fixed relation to the work piece 40. The fixed element 60 may be the head of a screw threaded into the frame on which the work piece mounting is carried. The element 60 when inside the button 42a or 43a serves as a pivot for the torque tester.

When the work piece 40 is rotating counterclockwise (Fig. 4), the torque tester is applied as shown in Figs. 4 and 5; that is, the button 43a receives the fixed element 60, as shown in full lines in Fig. 5 and the index member 54 is coupled to the end of the pivot member 52 which projects past the side plate 42, as shown in a full lines in Figs. 4 and 5. To find the counterclockwise drive torque of the work piece 40, the operator holds the handle 44 in one hand and swings the tool bodily, around the fixed pivot 60, clockwise (Fig. 4) so as to engage the friction ring 58 firmly with the work piece 40. Since the work piece is rotating counterclockwise, it will effect clockwise rotation of the friction ring 58 and the drum 47a. With the index member 54 in initial position, shown in Fig. 4, the tension on the wire 48 is not sufficient to brake the drum 47a. Hence, the friction ring 58 and drum 47a will be rotated freely by the work piece 40. Now, while holding the handle 44 in one hand in the position in which the friction ring 58 is firmly engaged with the periphery of the work piece 40, the operator grasps the knob 56 with the other hand and moves the index member 54 counterclockwise (Fig. 4). Leaf spring 50 is thereby flexed to an increasing extent, thereby applying greater spring tension to wire 4 and tightening its grip on the drum 47a. The index member is moved counterclockwise until the work piece is seen to stall, and the counterclockwise drive torque is indicated at this point by the position of the index member with respect to the scale 55.

When it is desired to measure the clockwise drive torque of the work piece 40, the torque tester is held in a position which is inverted with respect to its position shown in Fig. 4; that is, the top edge shown in Fig. 4 will appear as the bottom edge in the inverted position, as indicated in Fig. 6. Further, in the reversed position, the side plate 43 and its scale will be in view, with the graduations running upwardly; i. e., reversed with respect to the direction in which the graduations on plate 42 appear in Fig. 4. The index member 54 will be removed from the end of the pivot member 52, outside plate 42 and be attached to the opposite end outside plate 43, as indicated by dot and dash lines in Fig. 5. With the index member thus attached and the torque tester held in reversed position, the index member is initially in lower or counterclockwise position in which it points to the "1" graduation at the bottom of the scale appearing on the side plate 43. To apply the torque tester in its reversed position to the work, the button 42a receives the fixed pivot stud 60, as indicated by dot and dash lines in Figs. 5 and 6. The operator will grasp the handle 44 in one hand and swing it clockwise, about pivot stud 60, to bring friction ring 58 into firm engagement with work piece 40. Since the work piece, a fragment of which is shown in phantom in Fig. 6, is assumed to be rotating clockwise, it will rotate the friction ring 58 and drum 47a counterclockwise. With the other hand, the operator will grasp knob 56 and move the index member 54 clockwise, flexing the spring 50 until it applies sufficient tension to the wire 48 to brake the drum 47a and, thereby, the friction ring 58 and work piece 40, to a stop. At this point, the position of the index member on the scale inscribed on plate 43 indicates the clockwise drive torque of the work piece.

While there have been shown and described and pointed out the novel features of the invention as applied to a plurality of embodiments, it will be understood that various omissions and substitutions and changes in the form and details of the devices illustrated and in their operation may be made by those skilled in the art, without departing from the spirit of the invention. It is the intention, therefore, to be limited only as indicated by the scope of the following claims.

What is claimed is:

1. A hand tool to measure the torque on a rotatable work piece, comprising a carrier adapted to be held by one hand of an operator and bearing a scale of torque indications on an outside face, an index member pivoted on the carrier and adapted to be rocked by the other hand of the operator along the scale, a device journaled on the carrier and engageable with the work piece to be rotated thereby, and variably resistant counterbalance means connecting the index member to the device to exert increasing resistance to the rotation of the device and work piece as the index member is rocked by one hand of the operator in an increasing value direction along the scale while the carrier is held stationary by the other hand, with the torque value being given by the point of the scale opposite the index member when the counterbalance means is exerting stalling resistance to the rotation of the device and work piece.

2. A hand tool to measure the rotational torque on a circular work piece, comprising a carrier adapted to be held by one hand of an operator and bearing a scale of torque indications on an outside face, an index member mounted on the carrier to lie outside said face for coaction with the scale and adapted to be moved relatively to the scale by the other hand of the operator, a device journaled on the carrier and including a circular friction element engageable with the work piece to transmit rotation of the work piece to the device, and variably resistant counterbalance means connected to the index member and to the device, to be operated by the index member, upon movement thereof in increasing torque value direction along the scale, for increasingly resisting rotation of the device and work piece, said tool being applied by holding the carrier by one hand so that the friction element is engaged with the work piece to produce rotation of said device while the index member is moved by the other hand to cause the counterbalance means to increase resistance to rotation of the device and work piece until the work piece stalls, whereupon the position of the index member on the scale indicates the rotational torque.

3. A hand tool to measure the torque on a rotatable work piece, comprising a carrier adapted to be held by an operator in one hand and provided wtih a visible scale of torque value indications, an index member mounted on the carrier for movement along the scale and adapted to be grasped by the operator in the other hand to be so moved, a device journaled on the carrier and engageable with the work piece for rotation thereby relatively to the carrier while the carrier is held stationary by the operator in one hand, and variably resistant braking means connecting the index member to said device for braking the device and work piece to a halt, upon movement of the index member by one hand of the operator to the corresponding torque value indicating position on the scale, while the other hand of the operator is holding the carrier stationary.

4. A hand tool to measure the torque on a rotatable work piece, comprising a carrier adapted to be held by an operator and provided with a visible scale of torque value indications, an index member mounted on the carrier for movement along the scale, a device journaled on the carrier and engageable with the work piece for rotation thereby relatively to the carrier while the carrier is held by the operator against rotation, a brake drum rigid with and rotatable with the device, a braking element wrapped around the drum and anchored at one end of the carrier, and variably resistant counterbalance means connected to the braking element and to the index member to pull on the braking element with increasing force, as the index member is moved in ascending torque value direction along the scale, until the grip of the element on the drum is so tight as to stall the work piece, whereupon the stall torque is given by the position of the index member on the scale.

5. A hand tool to measure the torque of a rotatable work piece, comprising a carrier adapted to be held by an operator, a device journaled on the carrier and having an external portion engageable with the work piece to transmit rotation of the work piece to the device relatively to the carrier while the carrier is held stationary by the operator, a brake drum rigid with and rotatable with the device, a braking element wrapped around the drum and anchored at one end to the carrier, variably resistant torque counterbalancing means connected to the other end of the braking element, and torque indicating means provided on the carrier and including a manually movable member mounted for movement on the carrier and connected to the counterbalancing means to increase the pull of the counterbalance means on the braking element so as to tighten the grip of the braking element on the drum and stall rotation of the work piece as the movable member is brought to stall torque value indicating position.

6. A hand tool to measure the torque on a rotatable work piece, comprising an elongated carrier provided between its ends with pivot means engageable with a coacting fixed pivot element separate from the tool, to provide an axis about which the carrier may be swung bodily in the manner of a lever, a device journaled on the carrier to one side of the pivot means and including a friction ring engageable with the work piece by swinging the carrier about said axis and when so engaged transmitting rotation of the work piece to the device, torque indicating means provided on the carrier and including a manually movable member mounted on the carrier, and variably resistant torque counterbalancing means connected to the device and to the manually movable member for resisting the rotation of the device and work piece with increasing force as said member is moved in ascending torque value indicating direction.

7. A hand tool to measure the torque on a rotatable work piece, comprising an elongated carrier provided between its ends with pivot means engageable with a coacting fixed pivot element separate from the tool, to provide an axis about which the carrier may be swung bodily in the manner of a lever, a device journaled on the carrier at one side of the pivot means and including a friction ring engageable with the work piece by swinging the carrier about said axis and when so engaged transmitting rotation of the work piece to the device, torque indicating means provided on the carrier and including a manually movable member mounted on the carrier, and variable resistant torque counterbalancing means connected to the device and to the manually movable member for resisting the rotation of the device and work piece with increasing force as said member is moved in ascending torque value indicating direction, said carrier being held in one position when the clockwise rotational torque on the work piece is to be measured and held in inverted position when the counterclockwise torque of the work piece is to be measured, said indicating means including torque value scales on opposite sides, one of which is visible when the carrier is in one position and the other of which is visible when the carrier is in inverted position, and said manually movable member being adapted to be mounted at either side of the carrier for movement along the adjacent scale and to be moved in the same direction relative to a given edge of the carrier, when the carrier is in either of its positions, for operating the counterbalance to apply increasing resistance to the rotation of the device and work piece upon movement of the manually movable member in ascending value direction relative to either one of the scales.

8. A tool to measure the torque of a turnable work piece, comprising a carrier provided with a visible scale of torque indications, a coupling element turnably mounted on the carrier to be coupled to the work piece for common turning movement, a brake drum rigid with the coupling element, a brake band anchored at one end to the carrier and engaging the periphery of the drum, a pivot mounted on the carrier, an index pointer secured to the pivot and having a free end for scanning said scale, a leaf spring connected at one end to said pivot and at the other end connected to the free end of the brake band, whereby upon manually turning the pivot and the index pointer the leaf spring is flexed so as to apply increasing tension to the brake band for increasing the friction of the band on the drum and thereby increasing the counter-torque on the coupling element and work piece coupled thereto.

DONALD R. PIATT.
ROMAN UNTERSCHUTZ.